United States Patent

Reece et al.

[15] 3,652,889
[45] Mar. 28, 1972

[54] LAMINATED DYNAMOELECTRIC MACHINE CORE AND METHOD OF STACKING

[72] Inventors: Paul Reece, Scotia; Peter H. Graham, Schenectady, both of N.Y.

[73] Assignee: General Electric Company

[22] Filed: Jan. 18, 1971

[21] Appl. No.: 107,342

[52] U.S. Cl. .............................. 310/259, 310/217, 310/218
[51] Int. Cl. ........................................................ H02k 1/12
[58] Field of Search ................. 310/258, 259, 256, 257, 254, 310/269, 216, 217, 218, 91, 42

[56] References Cited

UNITED STATES PATENTS

| 1,756,672 | 4/1930 | Barr | 310/259 |
| 3,221,195 | 11/1965 | Hoffmann | 310/217 |
| 3,307,059 | 2/1967 | Kitano | 310/216 |
| 1,779,950 | 10/1930 | Reichel | 310/258 |
| 2,774,000 | 11/1956 | Ross | 310/259 |
| 2,792,511 | 5/1957 | Horstman | 310/259 |

FOREIGN PATENTS OR APPLICATIONS

| 974,711 | 4/1961 | Germany | 310/216 |

Primary Examiner—William M. Shoop, Jr.
Attorney—William C. Crutcher, James W. Mitchell, Frank L. Neuhauser, Oscar B. Waddell and Joseph B. Forman

[57] ABSTRACT

A dynamoelectric machine core is built up of laminations or punchings supported on longitudinal keybars, the laminations being asymmetrical with respect to the tooth and slot portions on the inner ends. Alternate layers of laminations are reversed and arranged so that the possibility of overheating due to induced voltage between keybars is minimized.

3 Claims, 6 Drawing Figures

PATENTED MAR 28 1972 3,652,889

INVENTORS:
PAUL REECE,
PETER H. GRAHAM,
BY W. C. Crutcher
THEIR ATTORNEY.

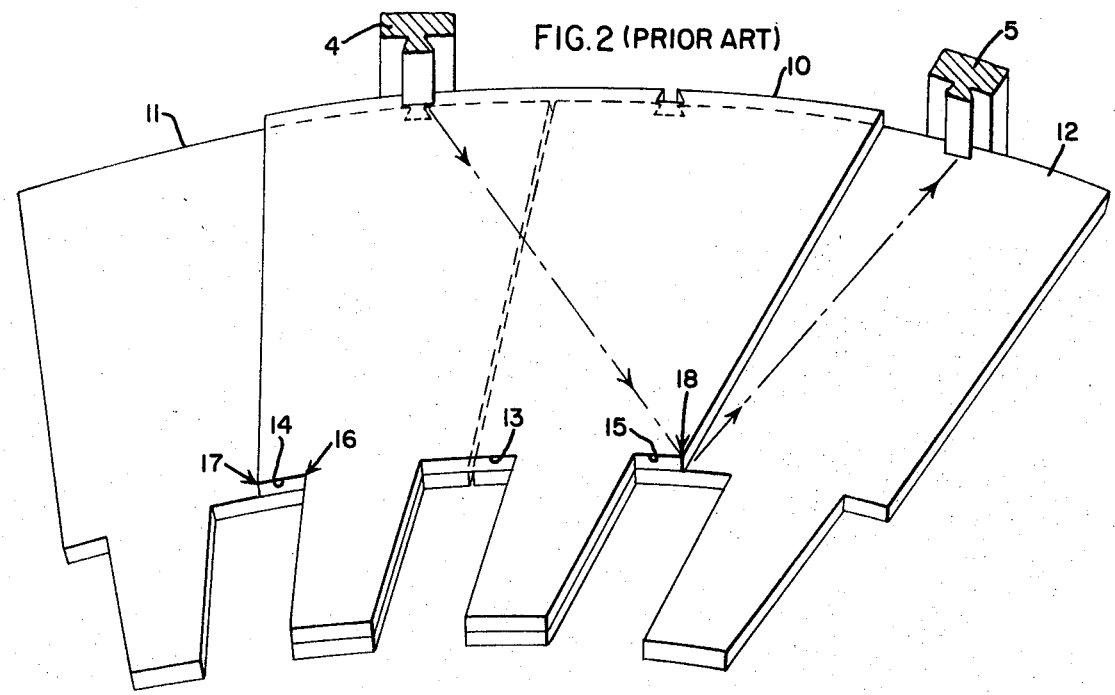
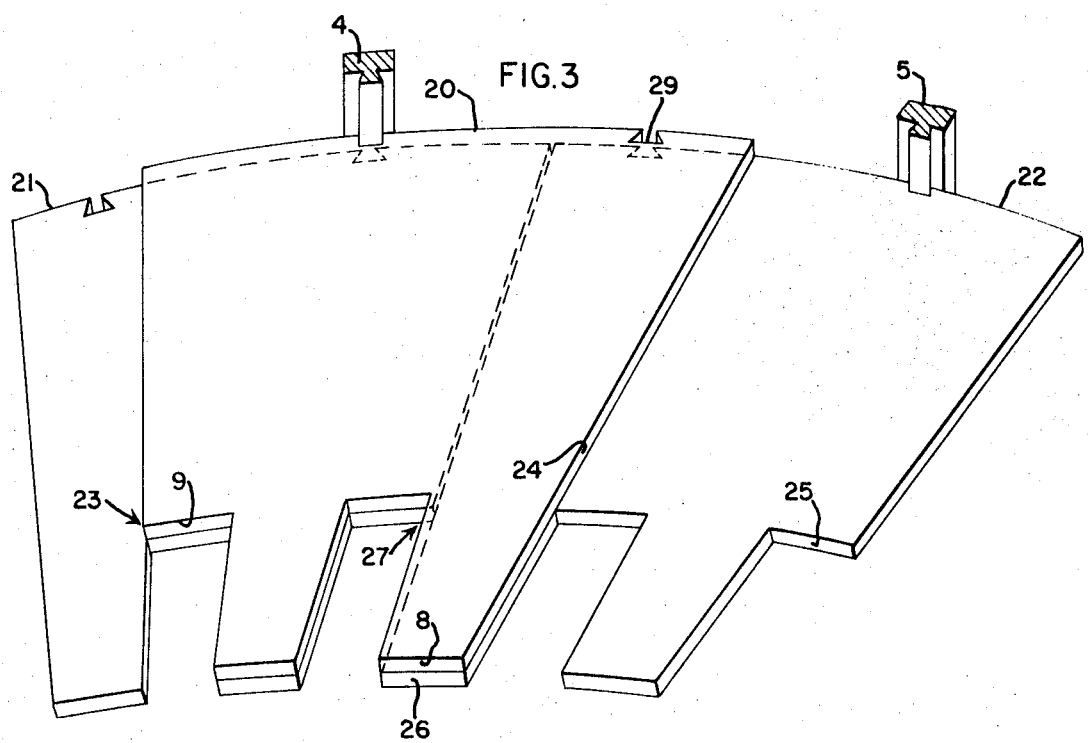

LAMINATED DYNAMOELECTRIC MACHINE CORE AND METHOD OF STACKING

BACKGROUND OF THE INVENTION

The cores of dynamoelectric machines are often composed of many layers of very thin laminations or punchings which provide a path for the magnetic flux in the desired direction while preventing undesirable eddy currents. The laminations are generally punched out of thin sheets of silicon-containing iron coated with an insulating film and are formed in the shape of circular sectors with cutout portions at the inner radius. These cutout portions, when aligned with similar punchings in many layers, together make up the teeth and slots of the dynamoelectric machine core for holding the windings. Since the punchings are very thin, the outside corners are particularly susceptible to burring or bending damage, and when the outside punching corners fall at the bottom of a slot, such damage is particularly difficult to detect and repair.

Under certain conditions of operation, metal-to-metal contact between laminations can give rise to flow of circulating currents and this in turn can lead to overheating and subsequent damage to the core.

Accordingly, one object of the present invention is to provide an improved dynamoelectric machine core construction with a simplified punching shape and economical construction of the core.

Another object of the invention is to provide an arrangement for a laminated dynamoelectric machine core which reduces the possibility of overheating due to inadvertent metal-to-metal contacts between punchings.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing, in which:

FIG. 1 is an end view, partly in section, of a dynamoelectric machine core and frame without the windings, FIG. 2 is a perspective view schematically illustrating a prior art construction, FIG. 3 is a similar perspective view schematically illustrating a preferred embodiment of the invention, and FIGS. 4, 5 and 6 illustrate modifications of the invention for one-tooth, two-tooth and three-tooth punchings.

SUMMARY OF THE INVENTION cutouts

Briefly stated, the invention is practiced by providing asymmetrical punchings with a full tooth portion on one side and a full slot cutout on the other side. The dynamoelectric machine core is constructed in layers with the punchings in alternate layers reversed so that the edges having the full slot cutouts run in opposite directions in alternate layers. The punchings are arranged on the keybars so that punchings which overlap on the slot cutout side are held by a common keybar.

DESCRIPTION OF THE PREFERRED EMBODIMENT

Figure 1:
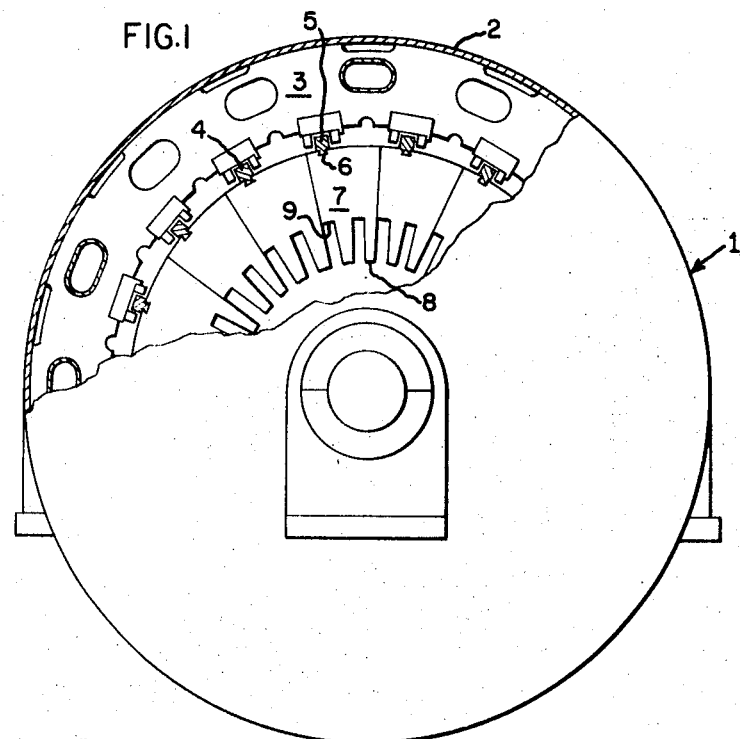

Referring now to FIG. 1 of the drawing, a dynamoelectric machine 1 has a frame composed of a wrapper 2 and axially spaced section plates 3. A group of longitudinally extending keybar members, such as 4, 5 are circumferentially spaced around the inner edges of section plates 3 and are suitably provided with dovetails or key portions 6 at their inner ends which serve to hold punchings or laminations 7 in the proper position.

In accordance with one aspect of the present invention, the punchings 7 are asymmetrical with respect to the punching centerline, in that they have a full finger portion 8 on one side and a full slot cutout portion 9 on the other side.

The present inventors herein concede that partially or fully asymmetrical punchings are themselves known in the art. For example, U.S. Pat. No. 1,756,672 to Barr shows a punching in which the tooth is partially asymmetrical with respect to the punching centerline and a publication by English Electric Company, entitled "Developments in Large Turbo-Alternators for Thermal Power Stations," Proceedings of Conference, November 1957, on page 16, shows a fully asymmetrical punching. However, as will be seen in the following description, the present invention pertains to a particular arrangement of asymmetrical punchings in the dynamoelectric machine core which is not suggested by the aforementioned prior art.

Referring now to FIG. 2 of the drawing, the background for the invention will be enhanced by a review of a prior art construction shown in perspective. The problem can be stated by a consideration of three punchings 10, 11 and 12 supported on two adjacent keybars 4, 5, The laminations are of an identical prior art construction and are symmetrical about their centerlines with a full slot cutout 13 in the middle and half slot cutouts 14, 15 on either side. Inside corners such as 16 are relatively free from problems during handling, but outside corners such as 17 and 18 are susceptible to possible bending or burring and, once assembled in the bottom of the slot, are difficult to detect.

Under normal operating conditions, the magnetic core of a large generator provides an easy path for the machine flux to travel. Under high virtual voltage conditions, however, the magnetic core becomes saturated at its ends because it is trying to carry too much flux and, as a result, leakage flux escapes out into the air spaces behind the core. This leakage flux links electromagnetically with the keybar members and induces a voltage along them.

Because of the voltages induced along the keybars, and because there are now numerous electrical circuits provided by the interconnecting flanges and section plates, currents can flow in the keybars, flanges, and section plates driven by the voltages along the keybars. Thus there is a voltage difference between adjacent keybars 4, 5. If we consider the two outside slot corners on lamination 10 to inadventently be in electrical contact with the respective punchings 11, 12, it will be seen that no current will flow at point 17, because punchings 10 and 11 are on the same keybar 4 and hence there is no keybar voltage difference between them. On the other hand, point contact at the outside slot corner 18 will provide a current path between keybars 4, 5 giving rise to possible overheating.

The normal manner of stacking the core shown in FIG. 2 is to circumferentially displace each layer of punchings by one slot width so that they overlap in the middle. Therefore, the construction shown is repeated over and over again; the three punchings shown serving to illustrate all possible conditions.

Referring now to FIG. 3 of the drawing, the invention is shown in its preferred embodiment and illustrated by asymmetrical punchings 20, 21, 22 held on keybars 4, 5. Each punching such as 20, by comparison to FIG. 1, includes the aforementioned full tooth portion 8 on one side and full slot cutout 9 on the other side. By this means, there is only one outside slot corner designated 23 on punching 20, since the other side 24 of the lamination is straight throughout its length. The full upper layer of punchings is oriented in a manner similar to punching 20 so that the full slot cutout edges are always on the left when going around the circumference of the core. Every alternate lamination layer along a selected length of the core is arranged in this manner.

In accordance with the second aspect of the invention, the intervening layers of laminations are turned over and run in the opposite direction. Illustrative of this is punching 22 with a full slot cutout portion on the right, designated as 25, and a full tooth portion on the left, designated 26. The entire layer illustrated by punchings 21, 22 is built up in the same way with the full slot cutout edges now on the righthand side in every case since the punchings have been turned over. The outside slot corner of punching 21 is partially hidden, but shown by numeral 27. numeral It will be observed that the punchings are arranged so that the pair 20, 21 on which the slot cutout sides overlap are held by a common keybar, in this case, keybar 4. Therefore, voltages induced between keybars 4, 5 there cannot cause current flow from one punching layer to the next through outside slot corners. Although the pair 20, 22 also overlap and are held on two different keybars 4, 5, there are no outside corners at the bottom of the slot.

The punchings such as 20 is FIG. 3 show a vacant keybar slot 29. This actually is not required if alternate layers are built up by turning the punchings over along the entire generator core, since proper overlap will be provided by only one keybar slot per punching. Therefore, the invention also comprehends asymmetrical punchings with only one keybar slot per punching as shown in FIG. 1. However, an extra keybar slot 29 may be provided if it is desired to utilize the improved construction along only one portion of the core and to utilize a conventional stacking along another portion of the core. In the latter case, each punching layer is merely rotated by one slot width along the conventionally stacked portion using the extra keybar slot 29, and overlap will occur at the lamination midpoint as in the prior art construction of FIG. 2.

Figure 4:
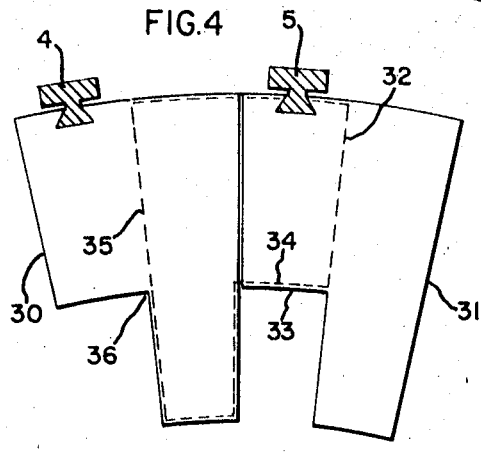
Figure 5:
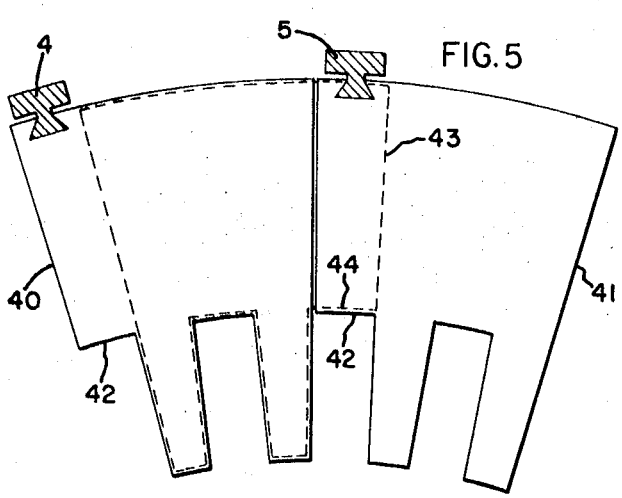

Referring to the modifications of the invention, FIG. 4 shows single tooth punchings 30, 31 with alternate layers of reversed punchings 32 shown in dotted line and slightly in smaller size so as to distinguish its location. The overlapping sides with full slot cutouts 33, 34 in adjacent layers are both on punchings 31, 32, held by a common keybar 5. Punchings 30, 32 which are not on a common keybar have either full straight sides 35, or inside slot corners 36 which are not susceptible to the problems outlined, FIG. 5 illustrates two-tooth punchings 40, 41 with full slot cutouts 42 going to the left, or counterclockwise, and alternate layers of reversed punchings such as 43 with full slot cutouts 44 on the right, or running clockwise. The pair of punchings 41 and 43 which overlap on the full slot cutout sides are held on the same keybar 5.

Figure 6:
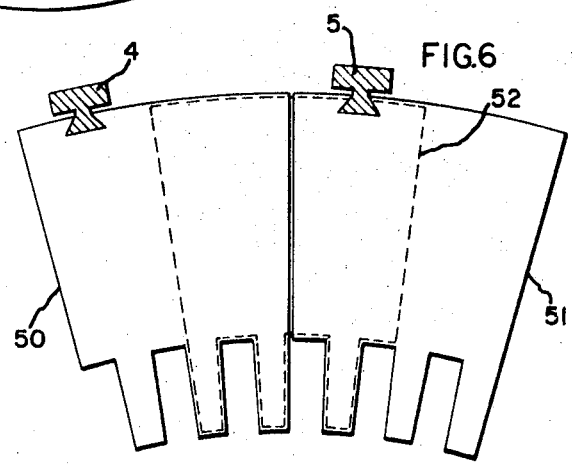

FIG. 6 illustrates a three-finger-per punching arrangement, wherein punchings 50, 51 are turned in one direction to make up one layer, and a series of punchings such as 52 are reversed as indicated to make up the alternate layers. As before, punchings 51, 52, which overlap on the sides with full slot cutouts, are held on a common keybar 5. Punchings 50, 52 which overlap and are held on adjacent keybars 4, 5 respectively do not have outside corners in the slot which can touch one another, even though they might be at different voltages.

Thus it will be seen that an improved laminated core construction has been shown which is simple and which uses only one keybar supporting member per lamination. The construction provides simplifications and reduction of possible lamination damage through the employment of asymmetrical punchings. A laminated core constructed according to the illustrated method of reversing alternate layers of asymmetrical punchings has reduced tendency to overheating due to induced voltages along the keybar support members. The invention is applicable to punchings with any number of teeth, so long as they are arranged to overlap as indicated.

While there has been shown what is considered to be the preferred embodiment of the invention, it is of course understood that various other modifications may be made therein, and it is intended to cover in the appended claims all such modifications as fall within the true spirit and scope of the invention.

We claim:

1. In a dynamoelectric machine comprising a plurality of longitudinal keybar members spaced circumferentially within a frame and supporting a plurality of layers of punchings making up a slotted core, the improvement comprising:
   a core section comprising a plurality of alternating first and second layers of punchings,
   each of said punchings being asymmetrical about its centerline so as to define a full tooth on one side and a full slot cutout on the other side,
   the punchings in the first layer having the sides thereof with said slot cutouts running circumferentially in one direction, the punchings in the second layer having the sides thereof with said slot cutouts running circumferentially in the other direction, and
   each pair of punchings in the first and second layers which overlap on the slot cutout sides thereof defining also aligned keybar slots for holding a common keybar member.

2. The combination according to claim 1, wherein each of said punchings includes additional full tooth portions and an equal number of additional full slot cutouts alternating between said side tooth portions and said side slot cutouts.

3. An asymmetrical punching for a keybar-supported dynamoelectric machine core, comprising a punching having an outer edge and side edges, said punching being asymmetrical about its centerline so as to define at least one full tooth portion bounded in part by a straight extension of one side edge and a full slot cutout oppositely disposed from the punching centerline, said punching also defining in its outer edge on the slot cutout side of said centerline a single keybar slot adapted to fit said keybar member, whereby said punchings may be overlapped and shifted circumferentially using said single keybar slot as they are stacked by reversing alternating layers of punchings.

* * * * *